United States Patent [19]

Lewiner et al.

[11] Patent Number: 4,857,913

[45] Date of Patent: Aug. 15, 1989

[54] CODED OBJECTS IDENTIFIABLE BY PROXIMITY AND DEVICES FOR CHANGING THE CODES OF THESE OBJECTS

[75] Inventors: Jacques Lewiner, Saint Cloud; Claude Hennion; Didier Leonard, both of Paris, all of France

[73] Assignee: Societe Fontaine, Paris, France

[21] Appl. No.: 125,655

[22] Filed: Nov. 25, 1987

[30] Foreign Application Priority Data

Nov. 27, 1986 [FR] France ................................. 86 16583

[51] Int. Cl.$^4$ ........................... G06K 5/00; H04Q 1/48
[52] U.S. Cl. ......................... 340/825.310; 340/825.34; 340/825.54; 235/382.5
[58] Field of Search ........... 340/825.54, 825.3, 825.31, 340/825.34; 235/382, 449, 492, 487, 382.5, 375

[56] References Cited

U.S. PATENT DOCUMENTS

| | | | |
|---|---|---|---|
| 4,631,708 | 12/1986 | Wood et al. | 340/825.54 |
| 4,661,691 | 4/1987 | Halpern | 340/825.31 |
| 4,724,427 | 2/1988 | Carroll | 340/825.54 |

OTHER PUBLICATIONS

National Semiconductor: "NMC9306/COP494 256-Bit Serial Electrically Erasable Programmable Memory", Feb. 1983; pp. 1-6.

Primary Examiner—Donald J. Yusko
Assistant Examiner—Brian S. Palladino
Attorney, Agent, or Firm—Larson and Taylor

[57] ABSTRACT

The invention relates to electronic badges equipping portable objects, such as plastified cards and capable of being identified at a distance by suitable readers in order to ensure operation such as the unlocking of a lock. These badges are of a passive type, that is to say supplied exclusively from the outside by inductive coupling and they are in addition of a type reprogrammable through channels, each comprising an inductive coupling (at the level of inductances) from a suitable apparatus. The circuitry for forming the binary coded identification signals of the badge comprise a dead memory, a life memory or buffer and a rapid reading and writing circuit which provides the connections between these two memories, as well as the connections between the dead memories and the reprogramming channels.

4 Claims, 1 Drawing Sheet

CODED OBJECTS IDENTIFIABLE BY PROXIMITY AND DEVICES FOR CHANGING THE CODES OF THESE OBJECTS

BACKGROUND OF THE INVENTION

The invention relates to portable objects equipped with an electronic circuit adapted to form a binary coded identification signal—circuit called "badge" below—, the coded signal being identifiable by an interrogator-reader situated at a short distance from the object, without direct contact with it.

It relates more particularly, among these objects, to those whose badges are "passive", that is to say do not carry any source of electrical energy, the supply of each badge being ensured by an inductive coupling of a component of this badge with an external component in which an electrical voltage is generated at high frequency F.

It is also directed at devices enabling the "reprogramming" of the badges concerned, that is to say the changing of the codes which are recorded in these badges and which serve for forming the coded identification signals.

It is to be noted that, each badge identification being effected at a distance, without metallic contact, it is possible to place this badge inside an electrically insulating envelope which is completely closed and sealed, which is advantageous for the protection and hence the longevity of the badge.

The existence of this envelope excludes the use of metal contacts for reprogramming codes and it is hence necessary to effect the transmission of the different orders ensuring this reprogramming by means of electromagnetic couplings, particularly inductive, passing through said envelope.

Now, in the embodiments proposed hitherto, such reprogramming of the badges was effected:
   either through metal contacts,
   or through coupling at a distance, particularly inductive coupling, but then only in the case where the badge to be reprogrammed was "autonomous", that is to say possessed itself a source of electric power.

The current consumption required for the writing, the reading and the rewriting of the memories in which the identification codes of the badges were recorded required in fact recourse to several continuous voltages of different amplitudes, of which amplitudes the largest was relatively high.

GENERAL DESCRIPTION OF THE INVENTION

It is a particular object of the invention to overcome these various drawbacks by making possible reprogramming of badges of the passive type housed in closed and completely insulating envelopes.

To this effect, the badge concerned is essentially characterized according to the invention in that it comprises:

On the one hand, to form each coded signal, a programmable or reprogrammable dead memory which can store and preserve durably the successive identification codes of the badge, and on the other hand, to permit modification of the contents of the dead memory, a sequence of n oscillating circuits tuned to as many different high frequencies $F_n$ different from F each associated with a demodulator of said frequency $F_n$, n being an integer comprised between 1 and 20.

In addition, a programming apparatus is provided adapted to cooperate with the above-defined badges for the purpose of modification of the contents of their dead memory, which apparatus is essentially characterized in that it comprises:

on the one hand an alternating voltage generator at the frequency F supplying an oscillating circuit tuned to this frequency F.

on the other hand n oscillating circuits tuned respectively to the frequencies $F_n$ and each associated with an electrical voltage oscillator at the frequency $F_n$, and with a modulator in which this voltage is modulated to all or nothing by a binary coded signal itself formed by a suitable programming member, and on the other hand also a receptacle suitable for receiving the objects equipped with the badges to be programmed so that the positioning of each of these objects in this receptacle automatically ensures a close inductive coupling in pairs of the inductances of the oscillating circuits comprised respectively by said badges and by said apparatus and corresponding to identical frequencies (F, $F_n$).

In preferred embodiments, in addition, the coded signal transmitted by one of the n parallel channels formed, on the inductive coupling realized between the programming apparatus and each badge, between the programmer of the first and the dead memory of the second, is an alarm signal adapted to place the badge in programming condition, that is to say to connect the different inputs of its dead memory to the above different channels.

The invention comprises, apart from these main features, certain other features which are preferably used simultaneously and which will be more explicitly considered below.

BRIEF DESCRIPTION OF THE DRAWINGS

In the following, a preferred embodiment of the invention will be described with reference to the accompanying drawing, not to be considered of course as in any way limiting.

BRIEF DESCRIPTION OF PREFERRED EMBODIMENTS

Figure 1:
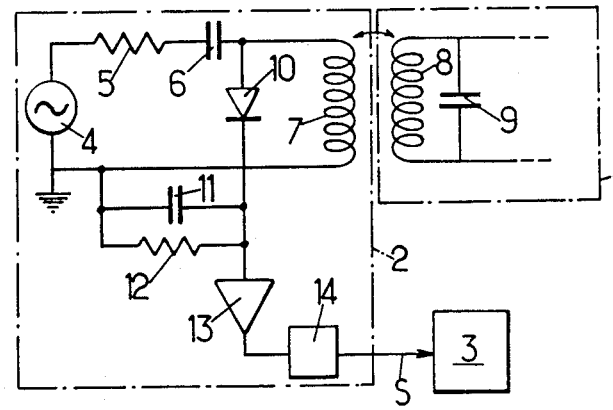
FIG. 1, of this drawing, shows diagrammatically a device for identification by proximity to which the invention relates, said device comprising a badge to be identified and an identification interrogator-reader associated with a security apparatus designed to be actuated by the badge.

The badges 1 concerned by the invention are electronic circuits adapted to form coded binary identification signals, said signals being intended for transmission for identification purposes to suitable interrogator-readers 2, this transmission being effected by proximity, that is to say at a short distance, without direct mutual contact between the badge and the interrogator-reader.

Each interrogator-reader 2—called "reader" in the following—is associated with a security apparatus 3 to which it delivers electrical actuating signals S when the reading effected reveals an identity between the code of the identified badge and one of those accustomed to actuate said apparatus.

By way of non-limiting example, the apparatus 3 is a lock, the actuating signals S enable the lock to be unlocked.

The badges 1 are mounted on objects easy to carry and to manupilate, such as plastified cards and they are held exclusively by bearers entitled to actuate the apparatus 3.

The badges and the readers are of the type for which the electrical power of the badges is ensured exclusively at a distance from the readers, particularly by an inductive coupling, as has been described, for example, in the patent US-A-No. 3,299,424.

For this purpose, the reader 2 comprises a generator 4 of sine-wave electrical voltage of relatively high frequency F (for example of the order of 100 to 150 kHz) and a circuit comprising a resistance 5 an inductance 7 - and a capacitance 6 supplied by this generator, said circuit being tuned to the frequency F.

The badge 1, which is devoid of autonomous supply and hence of the "passive" type, also comprises a circuit comprising an inductance 8 - capacitance 9 tuned to the frequency F.

It is the two inductances 7 and 8 which permit the inductive coupling of the reader 2 with the badge 1 to be effected through their simple mutual approach, the whole then forming an air transformer.

In such a coupling, the magnetic field produced by the current which passes through each of the two inductances 7 and 8 produces a voltage induced in the other inductance.

There is then observed an interaction between the latter and the voltages resulting from this interaction are simultaneously exploited to power the badge electrically, to interrogate the latter and to transmit in return the coded response signals formed by the badge, which signals are then read and identified by the reader.

The reading concerned employs first the demodulation of the frequency F of said coded signals by means of a circuit composed of a diode 10, a capacitance 11 and a resistor 12, then the thus demodulated coded signals are amplified at 13 and applied to a decision member 14.

This member 14 is adapted to compare the code received with at least one previously recorded code, so as to emit towards the apparatus 3 an actuating signal S on the hypothesis that the comparison effected reveals an identity.

To form the DC-voltage U necessary for the electrical supply of the badge, the sinusoidal voltage $V_e$ collected at the terminals of the oscillating circuit is rectified by diode 15 (see FIG. 2), stored in a filtering capacitor 16 and regulated by a Zener diode 17.

Figure 2:
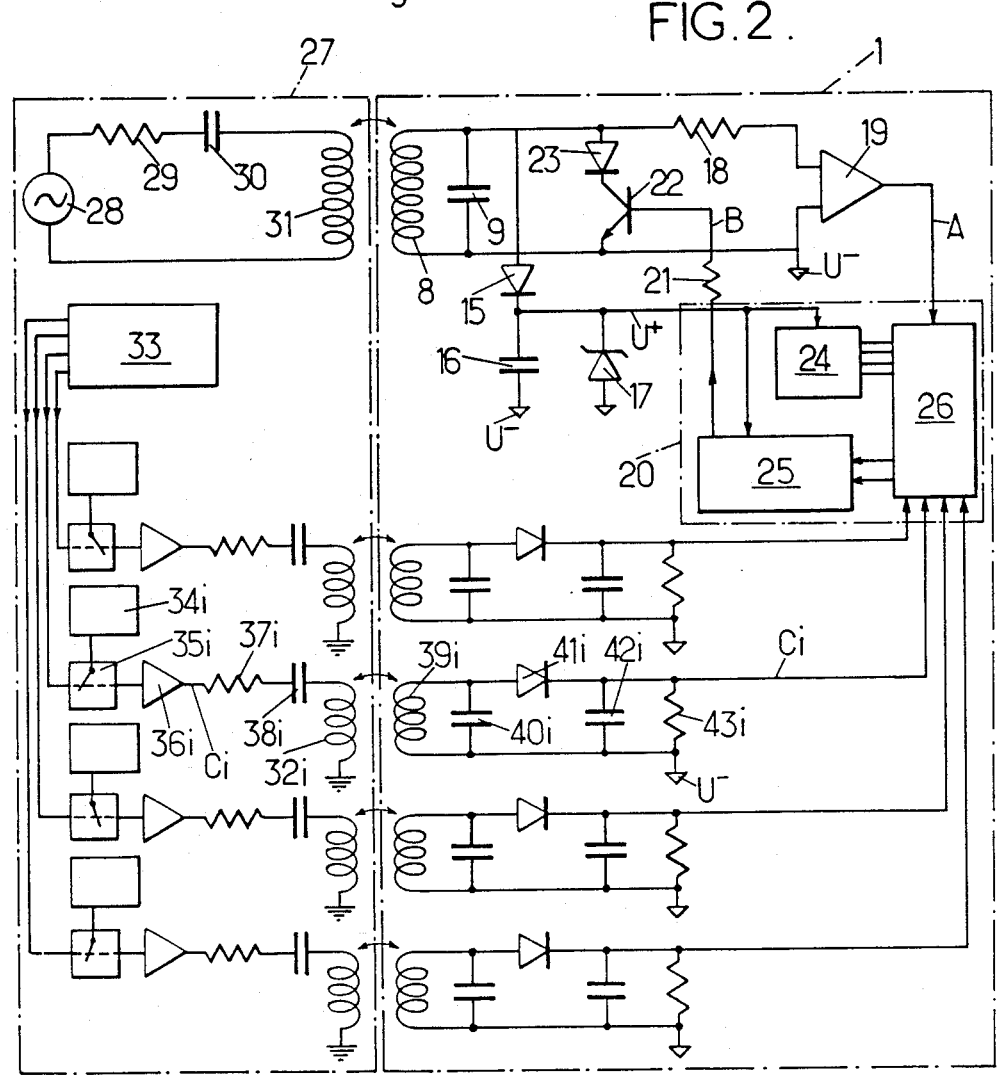
FIG. 2 shows diagrammatically an assembly constructed according to the invention comprising on the one hand a reprogrammable identification badge capable of forming part of the identification device of FIG. 1 and on the other hand, an apparatus for reprogramming this badge.

The locations of the badge 1 where are applied respectively the negative pole (which may be the ground) and the positive pole of this voltage U are denoted respectively in FIG. 2 by the symbols $U-$ and $U+$.

The sinusoidal voltage $V_e$ is in addition sent through a current-limiting resistor 18 to an input of the comparator 19 whose other input is supplied at $U-$, which gives a square voltage A of frequency F.

The voltage A is sent into a circuit 20 adapted to form coded binary signals B for identification of the badge 1.

These coded signals B control, through a resistor 21, an electronic switch constituted by transistor 22.

A diode 23 enables direct polarization of the collecter-base junction of this transistor 22.

The control of the transistor 22 by the coded voltage B short-circuits the resonant circuit of the badge, at the frequency or rhythm of this voltage, on a very weak load, which charge is constituted only by the transistor 22 and the diode 23.

Each change in state of the switch 23—whether this is its closing ensuring the short-circuit mentioned or its opening—generates a variation of the impedance mounted in parallel with the resonant circuit, and hence a concomitant variation of the voltage developed at the terminals of the inductance 8.

The variations of this voltage induce in their turn variations of the same type on the voltage developed at the terminals of the inductance 7 of the reader 2 (FIG. 1), when the two inductances 7 and 8 are sufficiently close together to be coupled inductively.

This latter voltage is exploited for the purposes of reading and identification by the reader 2 in a manner described above.

It is more particularly the circuit 20 adapted to develop the coded binary signals B which is concerned by the present invention: This circuit 20 is here programmable or reprogrammable by means of a particular programming apparatus 27 at a distance, that is to say without producing any ohmic contact between said apparatus 27 and the badge 1 which comprises said circuit 20.

To take into account the fact that the electrical power necessary for supplying the circuit 20 must be totally transmitted to the latter from the outside by an inductive coupling without ohmic contact, said circuit 20 is constituted so that it consumes on the average extremely little current.

To this purpose, it is made to comprise:

a dead memory or PROM(or more specifically, an EGPROM) 24 adapted to store successively and durably the different codes from which the coded signals for identification of the badge B are formed, a life memory or RAM 25 adapted to receive coded signals in very short times and to record provisionally the latter so as to then transmit them at a reduced speed to the exploiting circuits, and a rapid reading and writing circuit 26 adapted to establish the electrical connections necessary for reading very rapidly the contents of the dead memory 24 and storing the contents thus read in the life memory 25, or to modify the code written into the dead memory 24.

Through this fact, this memory 24 is only supplied for the reading during extremely short periods, or for writing.

An essential role of said memory 24 is to preserve durably the data which are stored therein when the badge does not receive any external supply, that is to say as long as there is no inductive coupling produced between its inductance 8 and an external supply inductance.

Now, with current technologies this type of memory consumes a relatively large current, typically of the order of some milliamperes and this consumption is of a nature to considerably compromise the performance of the reading at a distance from the badge, that is to say to reduce the maximum distance which can be envisaged for reading.

The formula proposed here enables the dead memory 24 to be read and its contents to be carried into the life memory 25, which is, for example, constituted by a shifting register C MOS, preferably with several stages, of which life memory the consumption is much smaller than that of the dead memory, this consumption being typically of the order of some tenth of microamperes only.

After each phase of rapid reading, the dead memory 24 is no longer supplied and the contents of the life memory 25 is transferred in series to the electronic exploitation switch 22 for the purposes of control of the latter.

The ratio between the rapid reading time of the dead memory and the total time comprising this reading and the transmission of the coded data to the switch 22 is very much less than 1 and can drop distinctly down to 1/20 or below.

As a result the average consumption of the whole circuit 20 over time is reduced in the same ratio, a continuous consumption of 3 milliamperes such as customarily observed within the scope of the use of a dead memory being translated here by an average consumption of the order of only 150 microamperes, which is much less a load for the supply circuit of the badge.

As seen in FIG. 2, the output A of the comparator 19 is applied to the circuit 26 and the two memories 24 and 25 are supplied as needed by the above DC-voltage U+.

The assembly constituted by the circuit 26 and the life memory 25 may be constituted in any desirable manner, for example by means of wired logic elements composed of integrated circuits (such as counters, shifting registers, flip-flops, inverters, multiplexers) or again by means of a minicomputer.

The programming and reprogramming of the badges is effected by means of the apparatus 27 at the level of the dead memories 24 of these badges.

This apparatus 27 comprises a suitable receptacle for the objects equipped with said badges.

It comprises in addition an assembly suitable for supplying these badges electrically at a distance, said assembly being similar to those of the readers 2, that is to say including a generator 28 of alternating voltage at frequency F supplying an oscillating circuit comprising a resistance 29 an inductance 30 and a capacitor 31 tuned to said frequency F.

It is this assembly which serves for supplying the badges 1 in the course of the programming operations, by coupling inductances 8 of these badges to the inductance 31.

The programming circuit proper comprises a first part in the apparatus 27 and a second part in each badge 1.

The first part of the programming circuit, borne by the apparatus 27, comprises n lines or parallel channels $C_i$ (n denoting a whole number comprised between 1 and 20, limits included and i being a whole number comprised between 1 and n, limits included) connecting to respectively n inductances $32_i$ a common minicomputer 33 generating n coded signals adapted to control the circuits 26 of the badges as well as the dead memories 24 for the purposes of programming or reprogramming of the latter.

Each channel $C_i$ of order i comprises:

an oscillator $34_i$ adapted to generate a sinewave voltage $V_i$ of high frequency $F_i$ different from F, a modulator $35_i$ itself receiving one of the outputs of the minicomputer 33 and adapted to modulate as all or nothing the voltage $V_i$ that it receives as a function of the message itself received from the minicomputer 33, a power amplifier $36_i$ adapted to amplify the thus modulated voltage, and an oscillating circuit supplied by the thus amplified voltage and comprising itself the inductance $32_i$, a resistance $37_i$ and a capacitance $38_i$.

The second portion of the programming circuit, said portion forming part of each badge 1, comprises also in parallel n channels $C_i$ each composed of an oscillating circuit comprising an inductance $39_i$ and a capacitance $40_i$ tuned to the frequency $F_i$ and a demodulation circuit of said frequency $F_i$ comprising itself a diode $41_i$, a capacitance $42_i$ and a resistor $43_i$, the output from the latter circuit being connected to an input of the rapid reading and writing circuit 26 of the badge.

In FIG. 2, it is assumed that the number n was equal to 4 and, for the purpose of simplification, there are only indicated the references comprising an index for the second of the channels concerned, the index adopted for this channel being i.

The operation of the programming unit is as follows.

The receptacle of the apparatus 27 and the object to be identified are arranged and dimensioned so that the simple positioning of any one of these objects in this receptacle automatically ensures a close inductive coupling on the one hand of the inductance 8 of the badge with the supply inductance 31 of the apparatus and on the other hand of the different inductances $39_i$ with the corresponding programming inductances $32_i$.

Under these conditions, each of the end lines or channels $C_i$ defined above ensures the transmission of a coded signal $S_i$ from the minicomputer 33 to the rapid writing circuit 26, and this without risk of mutual interference of these different signals due to the fact that the frequencies $F_i$ are different from each other.

In the course of this transmission, each coded signal $S_i$ modulates first as all or nothing a voltage at frequency $F_i$, then the thus modulated voltage, applied to terminals of the inductance $32_i$, induces in the inductance $39_i$ to which it is coupled, a voltage of a similar form, which, after demodulation of the frequency $F_i$, restores the coded signal $S_i$ at the level of the input of the circuit 26.

The first of the signals $S_i$, namely the signal $S_1$, is advantageously used to put the badge in an initialization or alert state and to advise it that it enters a programming phase.

The circuit 26 may contain for this purpose a multiplexer actuatable by such a signal $S_1$ so that the totality of the inputs of the dead memory 24 are then directly placed in communication with the programming bus, that is to say with the signals $S_2 \ldots S_n$.

The code contained in the dead memory 24 may easily be rewritten and hence be replaced by another code.

As the frequencies $F_i$ are different from the frequency F, the supply channel of the badge with electrical energy is completely uncoupled from the lines or programming channels and the latter remain totally inactive when the badges 1 are placed in the presence of readers 2 for the purposes of identification of their codes.

As a result of which, and whatever the embodiment adopted, there is obtained finally a unit for identification by proximity employing reprogrammable passive badges, of which constitution, operation and advantages result sufficiently from the foregoing.

As is self-evident, and as emerges besides already from the foregoing, the invention is in no way limited to those of its types of application and embodiments which have been more especially envisaged; it encompasses, on the contrary, all modifications, particularly those where the programmable or reprogrammable dead memories are of a type directly exploitable by circuits of identification and/or reprogramming without requiring recourse to life memories and/or to intermediate rapid reading an writing circuits.

We claim:

1. A portable coded badge identifiable by proximity, said badge comprising an electronic identification circuit for forming a coded binary identification signal which is identifiable by an interrogator-reader situated at a short distance from the badge, without direct contact with the badge, said badge being passive in the sense that the electrical supply thereof is provided by a simple inductive coupling of a component of said badge with an external component in which there is generated an electrical voltage of a high frequency F, wherein said badge comprises, для forming each coded binary signal, a programmable or reprogrammable ROM of a semiconductor type which can store and preserve durably successive identification signals produced by said identification circuit, and, for enabling modification of the contents of the ROM, a plurality of n oscillating circuits tuned to a like plurality of high frequencies $F_n$ different from F, n being an integer between 1 and 20, and the inductances of said oscillating circuits lending themselves easily to inductive coupling with programming or reprogramming circuits located externally of the badge.

2. A badge according to claim 1, further comprising a rapid reading and writing circuit, supplied by a voltage at high frequency, for reading at high speed and for writing the contents of the ROM, and a RAM of which the current consumption is much smaller than that of the ROM for storing temporarily coded data read by the reading and writing circuit and for transmitting the coded data in series to the identification circuit.

3. In combination, a portable coded badge identifiable by proximity and a programming apparatus for providing reprogramming of said badge, said badge comprising an electronic identification circuit for forming a coded binary identification signal which is identifiable by an interrogator-reader disposed at a short distance from the badge, without direct contact with the badge, said badge being passive in the sense that the electrical supply thereof is provided by a simple inductive coupling between a component of the badge and an external component wherein there is generated an electrical voltage of a high frequency F, said badge comprising a programmable or reprogrammable ROM of a semiconductor type for storing and durably preserving successive identification signals produced by said identification circuit and a plurality of n oscillating circuits tuned to a like plurality of high frequencies $F_n$ different from F for enabling modification of the contents of the ROM, each oscillating circuit being associated with a demodulator of said frequency $F_n$, n being an integer 1 and 20, and the inductances of said oscillating circuits enabling inductive coupling thereof to said programming apparatus; and said programming apparatus comprising: an alternating voltage generator for generating a voltage at said frequency F;

an oscillating circuit tuned to said frequency F;

further oscillating circuits tuned respectively to the frequencies $F_n$, each further oscillating circuit being connected to a modulator having a first input connected to an electrical voltage oscillator at the corresponding frequency $F_n$, and a second input connected to programming means for producing a binary coded signal used in modulating the voltage produced by the electrical voltage oscillator;

and a receptacle for receiving said badge to be programmed so that placing said badge in the receptacle automatically provides close inductive coupling between the inductances of the oscillating circuits of the badges and the respective further oscillating circuits of said programming apparatus which provide identical frequencies.

4. The combination as claimed in claim 3 wherein the oscillating circuits of said badge and the further oscillating circuits of the programming apparatus form n parallel channels when the programming apparatus is conductively coupled to said badge and wherein a coded signal is transmitted by one of the n parallel channels in the form of an initialization signal for providing for connection of the inputs of the ROM of the badge to the corresponding channels.

* * * * *